(12) United States Patent
Chen

(10) Patent No.: US 7,806,567 B2
(45) Date of Patent: Oct. 5, 2010

(54) DIFFUSER PLATE WITH CAMBERED AND PRISMATIC MICROSTRUCTURES AND BACKLIGHT USING THE SAME

(75) Inventor: Chung-Chuan Chen, Hsin-Chu (TW)

(73) Assignee: Au Optronics Corporation, Hsin-Chu (TW)

(*) Notice: Subject to any disclaimer, the term of this patent is extended or adjusted under 35 U.S.C. 154(b) by 242 days.

(21) Appl. No.: 11/868,647

(22) Filed: Oct. 8, 2007

(65) Prior Publication Data

US 2008/0089063 A1    Apr. 17, 2008

(30) Foreign Application Priority Data

Oct. 14, 2006    (TW) ............................. 95137902 A

(51) Int. Cl.
*F21V 5/02*    (2006.01)
(52) U.S. Cl. .................. 362/311.06; 362/606; 362/620; 362/97.2; 362/311.01; 362/330; 349/64
(58) Field of Classification Search .................. 362/16, 362/606, 620, 97.2, 97.3, 97.1, 260, 311.01, 362/330, 332, 333, 339, 355, 311.06–311.1; 349/57, 64
See application file for complete search history.

(56) References Cited

U.S. PATENT DOCUMENTS

| 3,988,609 | A | * | 10/1976 | Lewin | ...................... | 362/296.1 |
| 5,280,371 | A | | 1/1994 | McCartney, Jr. et al. | | |
| 7,033,057 | B2 | | 4/2006 | Su et al. | | |
| 7,213,936 | B2 | | 5/2007 | Wang et al. | | |
| 2005/0013001 | A1 | | 1/2005 | Pan et al. | | |

FOREIGN PATENT DOCUMENTS

| CN | 1869737 | 11/2006 |
| EP | 1 586 920 | 10/2005 |
| JP | 2002082623 | 3/2002 |
| JP | 2004127680 | 4/2004 |
| TW | M266469 | 6/2005 |

OTHER PUBLICATIONS

English language translation of M266469, Published Jun. 1, 2005.
English language translation of abstract of JP2002082623, Published Mar. 22, 2002.
English language translation of abstract of JP2004127680, Published Jan. 22, 2004.
Chinese language Office Action dated Nov. 16, 2007.
English language translation of abstract and pertinent parts of CN 1869737.

* cited by examiner

*Primary Examiner*—Ismael Negron
(74) *Attorney, Agent, or Firm*—Thomas, Kayden, Horstemeyer & Risley, LLP

(57) ABSTRACT

A backlight module includes a light source module and a diffuser plate. The diffuser plate has a plate body, a plurality of light-scattering areas and a plurality of light-gathering areas. The light-scattering areas and the light-gathering areas are alternately disposed on a light-entrance surface or a light-exit surface of the plate body. The light-scattering area includes a plurality of cambered units while each cambered unit has a convex cambered surface. The light-gathering area includes a plurality of prism lenses. Two side surfaces of the prism lenses intersect at an angle θ.

31 Claims, 9 Drawing Sheets

DIFFUSER PLATE WITH CAMBERED AND PRISMATIC MICROSTRUCTURES AND BACKLIGHT USING THE SAME

This application claims priority based on a Taiwan Patent Application No. 095137902, filed Oct. 14, 2006.

BACKGROUND OF THE INVENTION

1. Field of the Invention

The present invention generally relates to a diffuser plate and a backlight module using the diffuser plate; particularly, the present invention relates to a backlight module for use in a liquid crystal display (LCD) device and a diffuser plate for use in the backlight module.

2. Description of the Prior Art

Backlight modules are widely used in liquid crystal display (LCD) devices, computer keyboards, buttons of cellular phones, advertising billboards, and any other devices that require a light source. In the recent years especially, the markets for flat panel displays are rapidly expanding. As a result, the need for LCD panels in the markets is largely increased at the same time. Furthermore, the functional and structural designs of the backlight modules used in the LCD panels have been diversified, in order to accommodate the emerging market demands for the LCD panels.

However, when a backlight module is used in an LCD panel, the illumination uniformity of the outputting light applied to the LCD panel is usually one of the important factors that affect the overall performance of the LCD panel. Along with the expansion in the size of the LCD panels, the designs of the direct-light type backlight modules have become an area highly focused by the industry. Furthermore, providing uniform light illumination using a plurality of lamps, wherein the lamps are disposed in parallel with one another and distributed transversely with a selected interval, while preventing the formations of partial bright spots or partial dark areas has become one essential goal to achieve in the designs of the LCD panels.

FIG. 1 shows a conventional design of the backlight module disposed with a plurality of optical units for diffusing light and enhancing the illumination of the LCD panel. As shown in FIG. 1, the backlight module 10 includes a reflector plate 15 and a plurality of lamps 13 that are disposed in parallel with one another and distributed transversely with a selected interval. Furthermore, a plurality of optical units are disposed above the lamps 13, wherein the optical units are disposed in the following order: a diffuser plate 37, a bottom diffusion sheet 35, a brightness enhancement film 31, then a top diffusion sheet or dual brightness enhancement film 33. The light emitted from the lamps 13 will undergo a series of luminance and uniformity enhancing processes from traveling through the diffuser plate 37, the bottom diffusion sheet 35, the brightness enhancement film 31, and finally through the top diffusion sheet or dual brightness enhancement film 33. Thereafter, the light will enter a liquid crystal display (LCD) panel 50, which is disposed above the top diffusion sheet or dual brightness enhancement film 33.

From the practice of this conventional design, it can be concluded that as the transmittance of the diffuser plate 37, the bottom diffusion sheet 35, and the top diffusion sheet 33 decrease, the resulting performance on the light diffusion will be improved. However, when their transmittance decrease, the luminous efficiency of the LCD device will decrease correspondingly. As a result, a higher output power must be provided for increasing the brightness of the lamps 13. However, this may create a high power consumption problem.

Furthermore, in order to improve the performance of light diffusion, a plurality of microstructures of the same pattern can be disposed on the bottom diffusion sheet 35. Each microstructure has the ability to alter the direction of the light traveling through it; therefore, light will scatter after traveling through the microstructures on the bottom diffusion sheet 35. However, since the directions of the light entering the bottom diffusion sheet 35 are different, using the microstructures of the same pattern can not improve the performance of light diffusion effectively.

SUMMARY OF THE INVENTION

It is an object of the present invention to provide a backlight module that can enhance the uniformity of the outputting light.

It is another object of the present invention to provide a backlight module that can prevent loosing an excess amount of brightness.

It is another object of the present invention to provide a diffuser plate that can produce a better performance on light diffusion.

The backlight module of the present invention mainly includes a diffuser plate and a light source module that includes a plurality of light sources. The diffuser plate is disposed above the light source module. The diffuser plate includes a plate body, a plurality of light-scattering areas, and a plurality of light-gathering areas. The plate body includes a light-entrance surface and a light-exit surface, wherein the light-entrance surface is disposed facing the light source module. The light-scattering areas and the light-gathering areas are alternately disposed on the light-exit surface or the light-entrance surface of the plate body. Each light-scattering area is preferably disposed corresponding to the position of the light source, and each light-gathering area is disposed corresponding to the interval between every two adjacent light sources.

The light-scattering area includes a plurality of cambered units, wherein each cambered unit has a convex cambered surface. The light-gathering area includes a plurality of prism lenses. Each prism lens has two side surfaces, and the two side surfaces intersect at an intersecting angle θ. The value of this intersecting angle θ is related to the interval between two adjacent light sources and the distance from the light sources to the plate body.

The incidence angle of the light entering the plate body (the angle between the light emitted from the light source of the light source module and the normal line of the plate body) varies in different regions on the surface of the plate body. When the light generated by the light source module enters the plate body, due to the refraction index provided by the geometric structure of the convex cambered surface of the cambered unit, the light having the smaller incidence angle is refracted to the area above the interval between two adjacent light sources. On the other hand, due to the refraction index provided by the geometric structure of the prism lens, the light having the larger incidence angle is refracted to remain in the area above the light-gathering area. Due to the different refracting characteristics provided by the light-scattering area and the light-gathering area, the light emitted from the light sources can be diffuse uniformly.

DETAILED DESCRIPTION OF THE PREFERRED EMBODIMENT

The present invention provides a diffuser plate and a backlight module using the diffuser plate. In the preferred embodiment, the backlight module is used in a liquid crystal display (LCD) device. In a different embodiment, however, the backlight module can be used in a computer keyboard, buttons of cellular phones, an advertising billboard, and any other device that requires a planar light source. In addition, the present invention further includes an LCD device using the backlight module. In the preferred embodiment, the LCD device of the present invention includes a color LCD device. However, in different embodiments, the LCD device of the present invention may include a monochrome LCD device. The LCD device is generally referring to the display device that constitutes an LCD panel. This may include a home LCD television, an LCD monitor for a personal computer or a laptop computer, and an LCD screen for a cellular phone or a digital camera.

Figure 1:
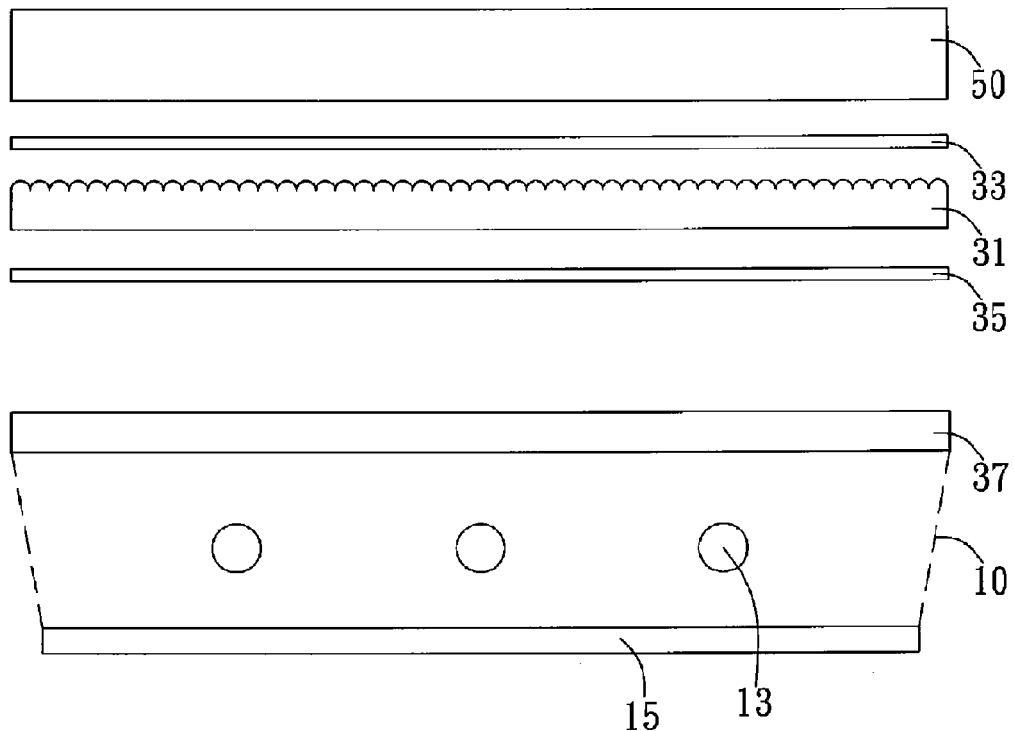
FIG. 1 illustrates a cross-sectional view of the conventional backlight module and the conventional liquid crystal display (LCD) panel.
Figure 2:
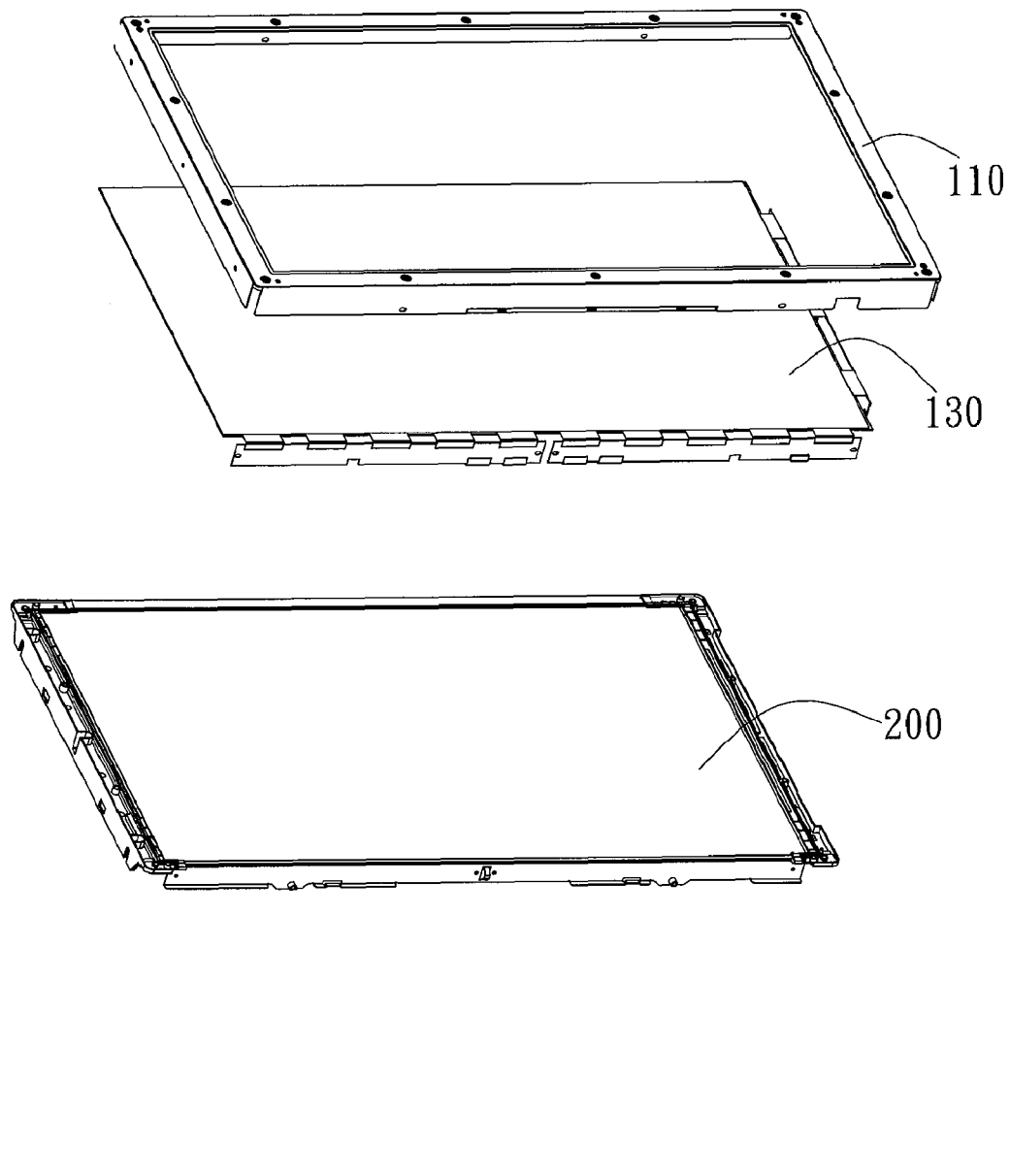
FIG. 2 illustrates an exploded view of an embodiment of the LCD device of the present invention.

As shown in FIG. 2, the LCD device of present invention includes a housing 110, an LCD panel 130, and a backlight module 200. The LCD panel 130 is disposed above the backlight module 200, and the housing 110 covers the LCD panel 130. The brightness and the color of the light emitted from the backlight module 200 will change by traveling inside the LCD panel 130; therefore, images are created and displayed on the LCD panel 130.

Figure 3:
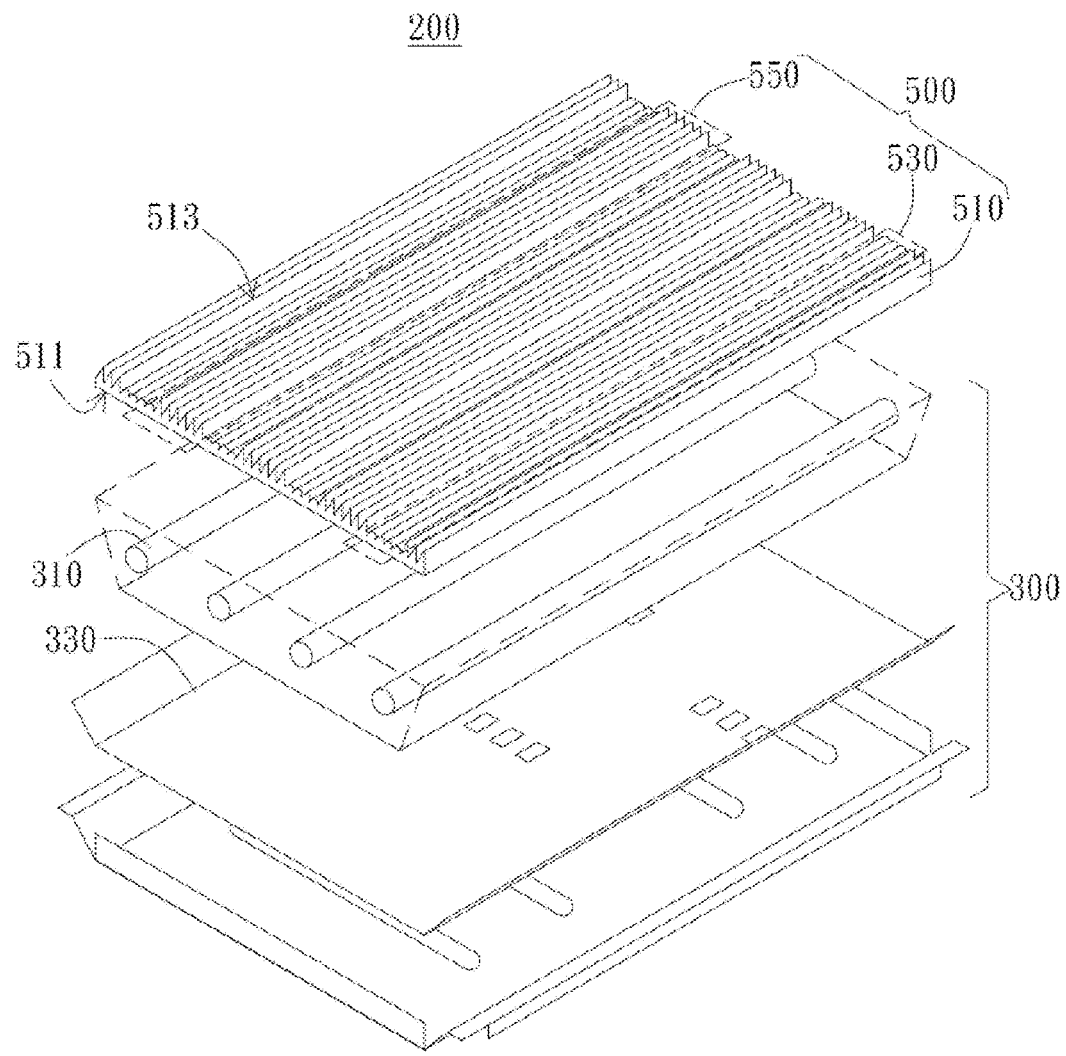
FIG. 3 illustrates an exploded view of an embodiment of the backlight module of the present invention.
Figure 4:
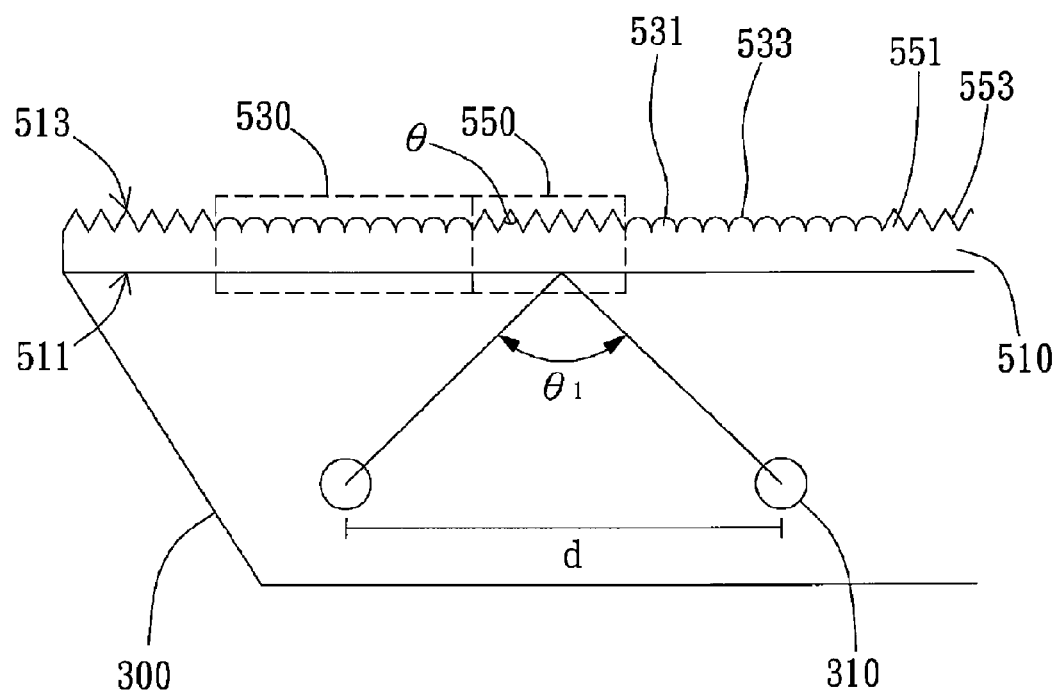
FIG. 4 illustrates a cross-sectional view of an embodiment of the backlight module of the present invention.

As shown in FIG. 3 and FIG. 4, the backlight module 200 includes a light source module 300 and a diffuser plate 500. The diffuser plate 500 is disposed above the light source module 300. The light source module 300 preferably includes a plurality of light sources 310 and a reflector plate 330. The light emitted from the light source 310 can enter the diffuser plate 500 directly. Alternatively, the light emitted from the light source 310 can be reflected by the reflector plate 330 and then enter the diffuser plate 500. In the preferred embodiment, the light source 310 includes lamps, such as cold cathode fluorescent lamps or hot cathode fluorescent lamps. In a different embodiment however, the light source 310 may include light emitting diodes or any other light producing devices.

In the embodiments shown in FIG. 3 and FIG. 4, the diffuser plate 500 includes a plate body 510, a plurality of light-scattering areas 530, and a plurality of light-gathering areas 550. The plate body 510 includes a light-entrance surface 511 and a light-exit surface 513, wherein the light-entrance surface 511 is disposed facing the light source module 300. Therefore, the light emitted from the light source module 300 will enter the diffuser plate 500 through the light-entrance surface 511. In the preferred embodiment, the plate body 510 is preferably light-transmittable, and the transmittance of the plate body 510 is preferably greater than 75%. The material of the plate body 510 may include polycarbonate (PC), polystyrene (PS), cyclo olefin polymer (COP), or other similar materials. Furthermore, light diffusion particles can be added to the plate body 510 to improve the performance of light diffusion.

Figure 5:
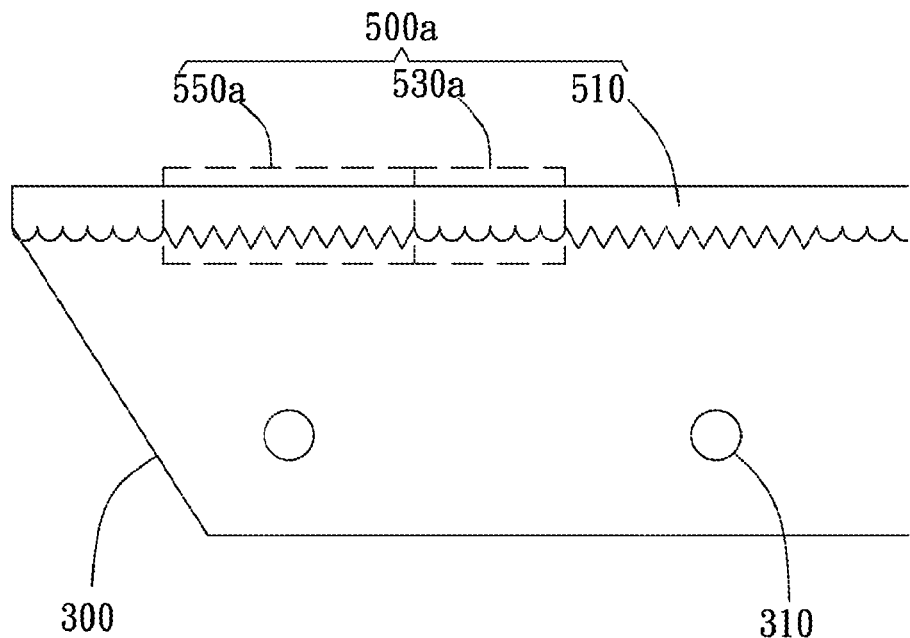
FIG. 5 illustrates a cross-sectional view of another embodiment of the backlight module.

A plurality of light-scattering areas 530 and a plurality of light-gathering areas 550 are disposed on the light-exit surface 513 or the light-entrance surface 511 of the plate body 510. As the embodiment shown in FIG. 4, the light-scattering areas 530 and the light-gathering areas 550 are disposed on the light-exit surface 513. However, in the different embodiment shown in FIG. 5, the light-scattering areas 530a and the light-gathering areas 550a can be disposed on the light-entrance surface 511. Furthermore, the light-scattering areas 530 and the light-gathering areas 550 can be disposed on the light-exit surface 513 and the light-entrance surface 511 at the same time.

Furthermore, the light-scattering areas 530 and the light-gathering areas 550 are alternately disposed, as shown in FIG. 4. In other words, each light-scattering area 530 is disposed between every two adjacent light-gathering areas 550. Each light-scattering area 530 is disposed above the light source 310, corresponding to the position of the light source 310. On the other hand, each light-gathering area 550 is disposed above the interval between every two adjacent light sources 310, corresponding to the position of the interval. In the embodiment shown in FIG. 5, however, the position of each light-scattering area 530a and the position of each light-gathering area 550a are switched. Therefore, each light-scattering area 530a is disposed corresponding to position of the interval between every two adjacent light sources 310, whereas each light-gathering area 550a is disposed corresponding to the position of the light source 310.

In the embodiment shown in FIG. 4, on a cross section of the plate body 510 across the light-scattering areas 530 and the light-gathering areas 550, the width of each light-scattering area 530 is nearly equal to the width of each light-gathering area 550. However, in the different embodiment, the width of each light-scattering area 530 and the width of each light-gathering area 550 can be modified to accommodate to the light sources 310 of different styles or the light sources 310 disposing in different distribution patterns. Generally, the ratio of the width of the light-scattering area 530 to the width of the light-gathering area 550 is between 0.33 and 3. Furthermore, the width of each light-scattering area 530 is preferably 0.25 to 0.75 times the distance between two adjacent light sources 310. As shown in FIG. 4, when the distance between the two adjacent light sources 310 is d, the width of each light-scattering area 530 is preferably between 0.25 d and 0.75 d.

The light-scattering area 530 includes a plurality of first microstructures. As the embodiments shown in FIG. 3 and FIG. 4, the first microstructure includes a cambered unit 531, and each cambered unit 531 has a convex cambered surface 533. In the preferred embodiment, the width of each cambered unit 531 is between 40 μm and 800 μm, and the height of each cambered unit 531 is between 20 μm and 400 μm. As shown in FIG. 3 and FIG. 4, the cambered unit 531 is preferably a semi-cylindrical lens extending longitudinally along the plate body 510, and the side face of the semi-cylindrical lens forms the convex cambered surface 533. Furthermore, when lamps are used as the light sources 310 of the light source module 300, it is preferable to have the semi-cylindrical lens extending longitudinally in the direction parallel to the lamps.

Figure 6:
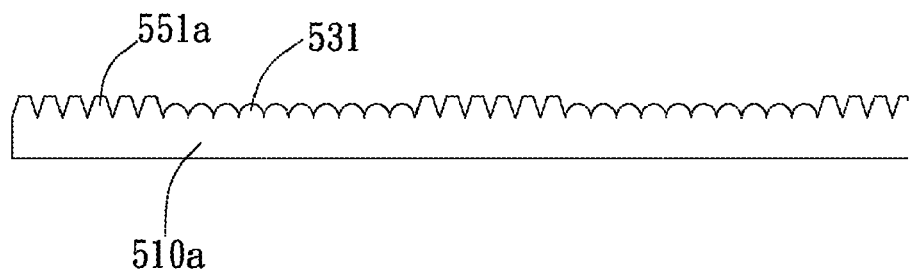
FIG. 6 illustrates a cross-sectional view of another embodiment of the prism lenses and the cambered units.

The light-gathering area 550 preferably includes a plurality of second microstructures. As the embodiment shown in FIG. 4, the second microstructure is a prism lens 551. As shown in FIG. 4, the prism lens 551 has two side surfaces 553, and the two side surfaces 553 intersect at an intersecting angle θ. The value of the intersecting angle θ is related to the interval between two adjacent light sources 310 and the distance from the light sources 310 to the plate body 510. In the preferred embodiment, the intersecting angle θ is 0.85 to 1.15 times the intersecting angle $\theta_1$ of the light from the two adjacent light sources 310. Furthermore, the angle of each prism lens 551 is preferably between 75° and 150°. In the embodiments shown in FIG. 3 and FIG. 4, the prism lens 551 is extending longitudinally along the plate body 510 and has a triangular cross section. In the embodiment of FIG. 6, however, the prism lens 551b is extending longitudinally along the plate body 510a and has a trapezoidal cross section or other polygonal cross section. Moreover, when lamps are used as the light sources 310 of the light source module 300, it is preferable to have each prism lens 551a extending longitudinally in the direction parallel to the lamps.

Figure 7:
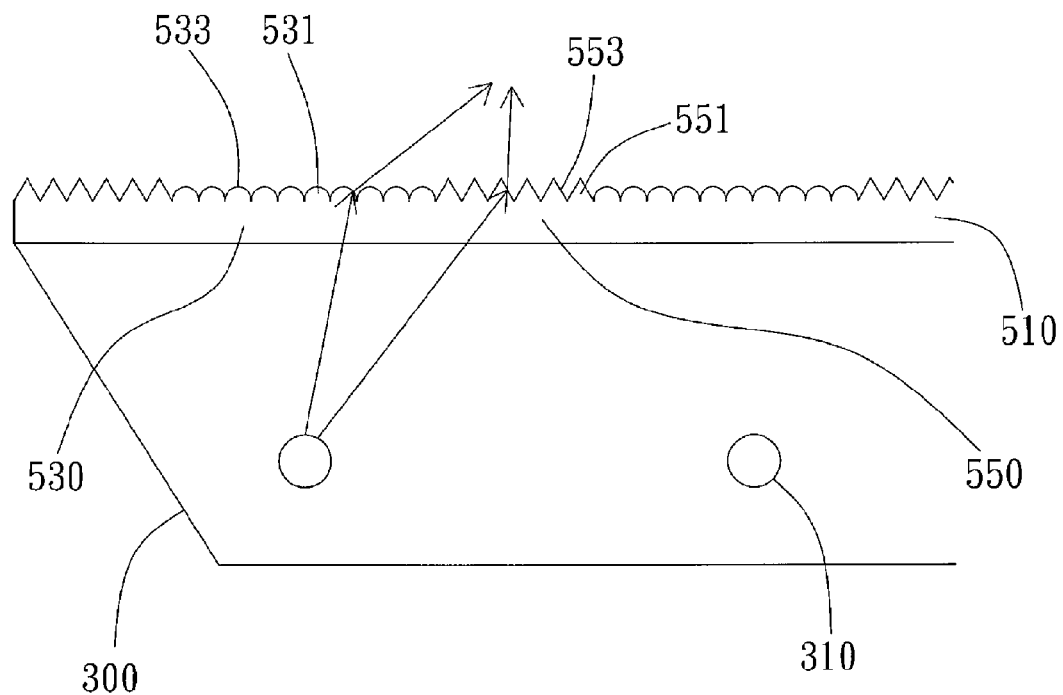
FIG. 7 illustrates a cross-sectional view of another embodiment of the backlight module for illustrating the behavior of the light traveling inside the backlight module.

The incidence angle of the light entering the plate body 510 (the angle between the light from the light source 310 of the light source module 300 and the normal line of the plate body 510) varies in different regions on the surface of the plate body 510. As shown in FIG. 7, the incidence angle of the light entering the area of the plate body 510 above light source 310 is smaller, while the incidence angle of the light entering the area of the plate body 510 above the interval between two adjacent light sources 310 is larger. As a result, the brightness of the area of the plate body 510 above the light source 310 of the light source module 300 is stronger than the brightness of the area above the interval between two adjacent light sources 310. When the light generated by the light source module 300 enters the plate body 510, due to the refraction index provided by the geometric structure of the convex cambered surface 533 of the cambered unit 531, the light having the smaller incidence angle is refracted to the area above the interval between two adjacent light sources 310. On the other hand, due to the refraction index provided by the geometric structure of the prism lens 551, the light having the larger incidence angle is refracted to remain in the area above the light-gathering area 550. Due to the different refracting characteristics provided by the light-scattering area 530 and the light-gathering area 550, the light emitted from the light sources 310 can be diffused uniformly.

Figure 8:
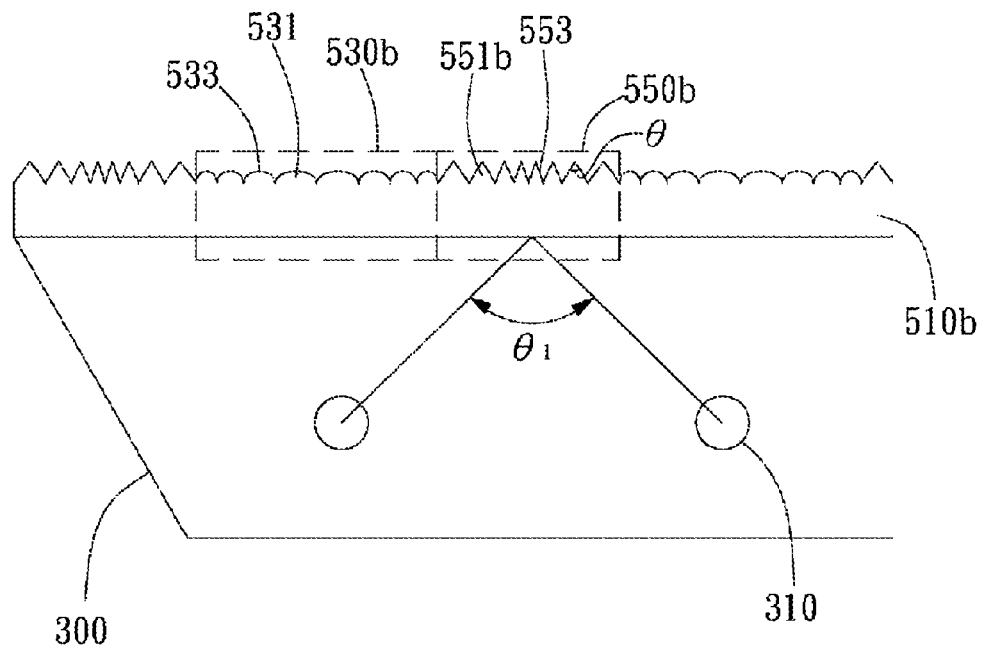
FIG. 8 illustrates a cross-sectional view of another embodiment of the diffuser plate.

FIG. 8 is showing another embodiment of the light-scattering area 530b and the light-gathering area 550b. As shown in the embodiment, for every light-scattering area 530b, the width of each first microstructure/cambered unit 531 close to a middle region of the light-scattering area 530b is greater than the width of each first microstructure/cambered unit 531 close to a side region of the light-scattering area 530b. In other words, each first microstructures/cambered units 531 that is closer to the area directly above each light source 310 has a greater width. By having a plurality of first microstructures/ cambered units 531 in different widths, the light-scattering area 530b can produce a better performance on light diffusion. Moreover, for every light-scattering area 530b, the curvature of the convex cambered surface 533 of each cambered unit 531 close to a middle region of the light-scattering area 530b is smaller than the curvature of the convex cambered surface 533 of each cambered unit 531 close to a side region of the light-scattering area 530b. The variation in curvatures of the convex cambered surfaces 533 of the cambered units 531 will correspond to the light of different incidence angles. As a result, the light diffusion performance is enhanced.

As shown in FIG. 8, for every light-gathering area 550b, the intersecting angle θ of the side surfaces 553 of each prism lens 551 close to a middle region of the light-gathering area 550b is smaller than the intersecting angle θ of the side surfaces 553 of each prism lens 551b close to a side region of the light-gathering area 550b. In other words, the side surfaces 553 of each prism lens 551b in the area farther from the light source 310 have smaller intersecting angle θ. By having variation in the intersecting angles θ of the side surfaces 553 of the prism lenses 551b, the light-scattering area 530b can produce a better performance on concentrating the light emitted from the light sources 310. Furthermore, in this preferred embodiment, the intersecting angle θ is 0.5 to 1.5 times the intersecting angle $\theta_1$ of the light emitted from the two adjacent light sources 310.

Figure 9:
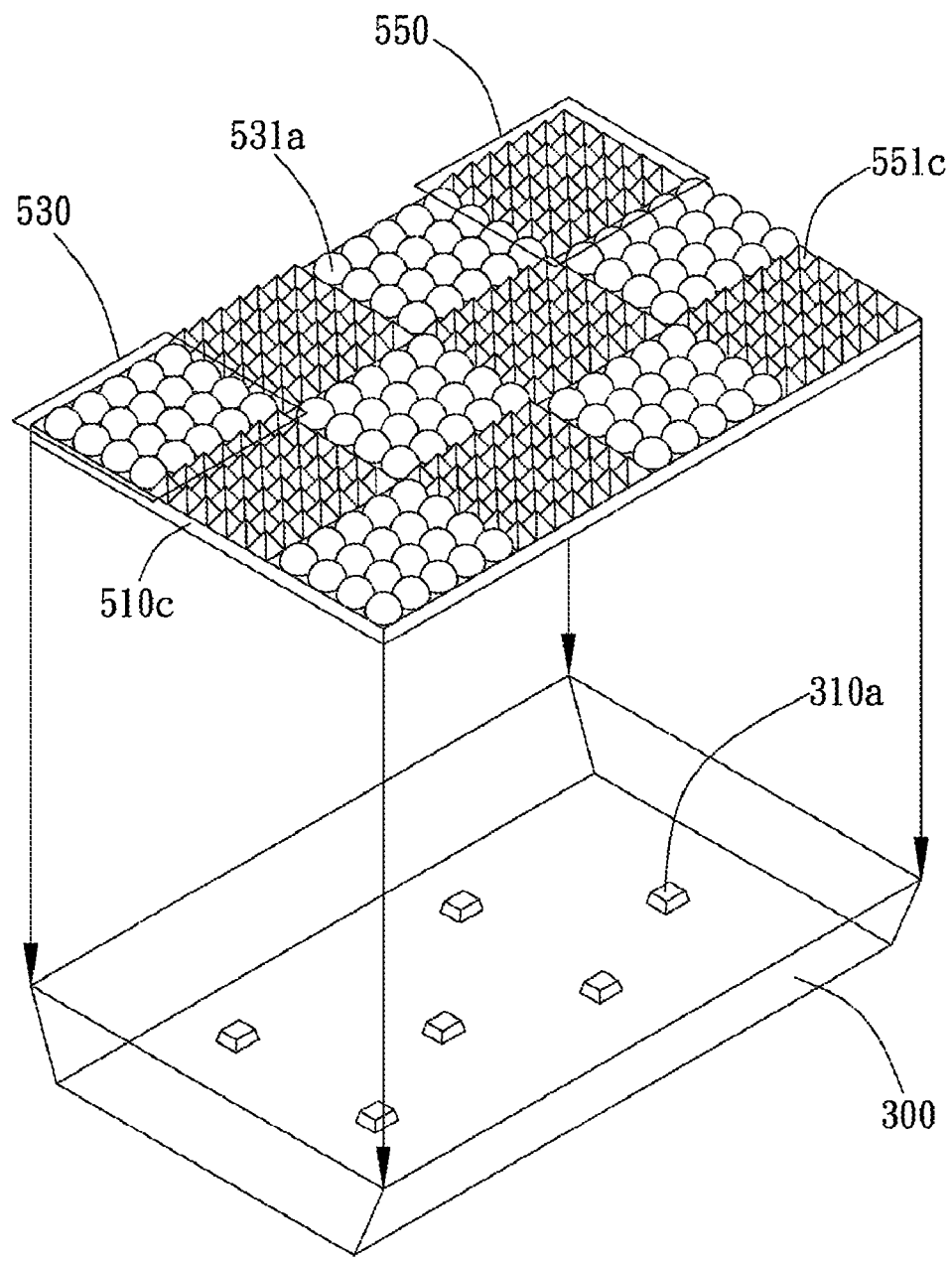
FIG. 9 illustrates a perspective view of another embodiment of the diffuser plate.

FIG. 9 is showing another embodiment of the light-scattering area 530 and the light-gathering area 550. In this embodiment, the light source 310a of the light source module 300 is a point light source such as a light emitting diode (LED). Furthermore, each cambered unit 531a of the light-scattering area 530 is preferably a semi-spherical lens, while each prism lens 551c of the light-gathering area 550 is preferably a pyramid lens. As a result, each light-scattering area 530 has a plurality of semi-spherical lenses disposing in a rectangular array format; similarly, each light-gathering area 550 has a plurality of pyramid lenses disposing in a rectangular array format. The rectangular arrays of the semi-spherical lenses and the rectangular arrays of the pyramid lenses are alternatively disposed on the plate body 510c in both the lateral direction and the longitudinal direction.

In the preferred embodiment, the light-scattering area 530 and the light-gathering area 550 on the surface of the plate body 510 are fabricated with the plate body 510 together at the same time by injection molding. In the different embodiment, however, the light-scattering area 530 and the light-gathering area 550 can be fabricated on the surface of the plate body 510 by compressing molding. Furthermore, the light-scattering area 530 and the light-gathering area 550 may also be fabricated on the surface of the plate body 510 by micro-contact printing, embossing, or any other suitable method.

Figure 10:
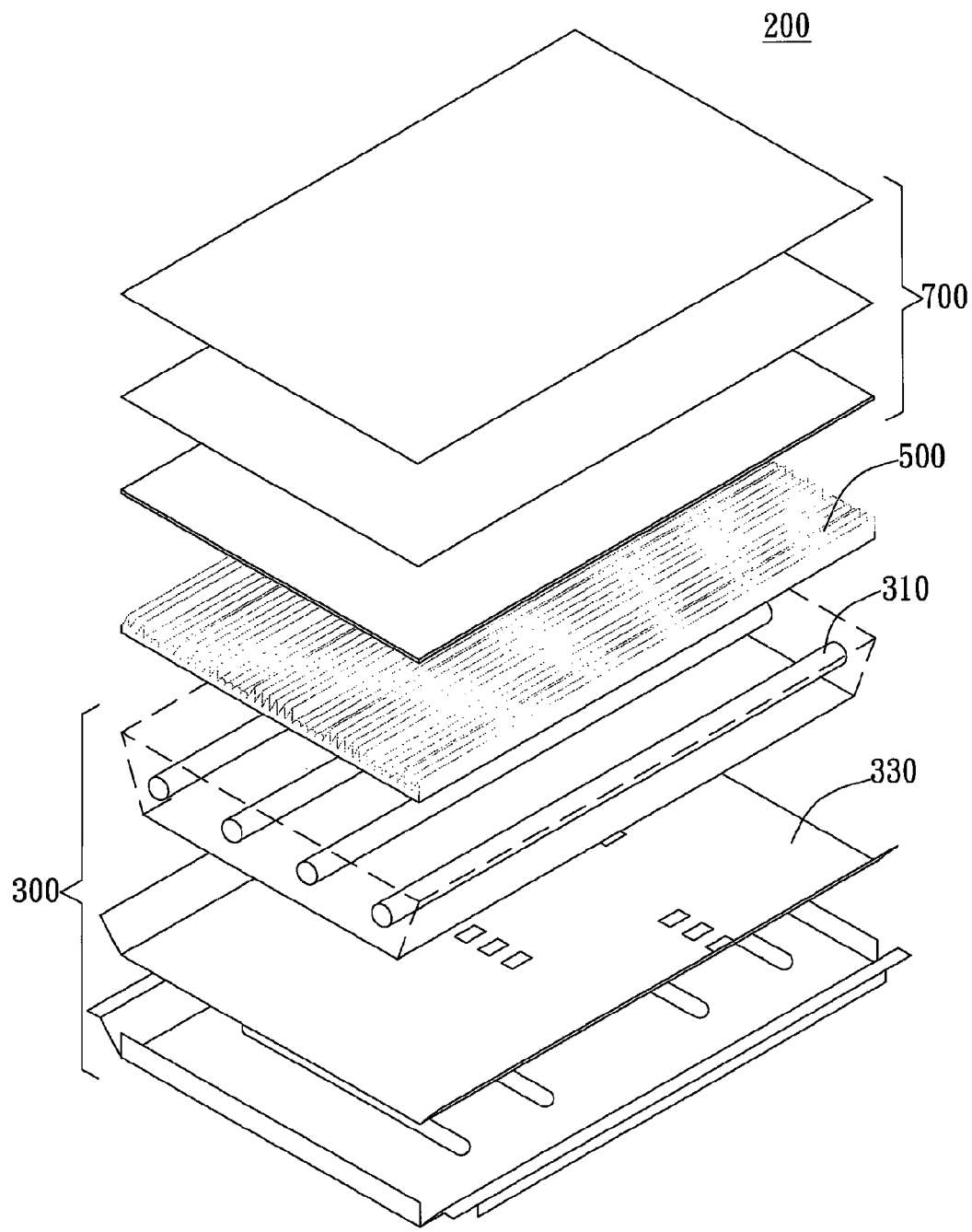
FIG. 10 illustrates an exploded view of another embodiment of the backlight module.

As shown in FIG. 10, the backlight module 200 may include at least one optical film 700. The optical film 700 is preferably disposing above the diffuser plate 500, and the optical film 700 can be a brightness enhancement film (BEF), a dual brightness enhancement film (DBEF), a polarizer film, etc. In the different embodiment, the backlight module 200 can further include at least one diffuser sheet disposing above the diffuser plate 500, in order to produce a much better result on light diffusion.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A diffuser plate for use in a light source module, comprising:
   a plate body having a light-entrance surface and a light-exit surface;
   a plurality of light-scattering areas disposed on at least one of the light-entrance surface and the light-exit surface of the plate body, wherein each light-scattering area includes a plurality of first microstructures; and a plurality of light-gathering areas disposed on at least one of the light-entrance surface and the light-exit surface of the plate body, wherein each light-gathering area includes a plurality of second microstructures;

wherein the light-gathering areas and the light-scattering areas are alternately disposed, the widths of the first microstructures in the light-scattering area varies in accordance with the distance between each first microstructures and the closest second microstructure.

2. The diffuser plate according to claim 1, wherein in the same light-scattering area, the width of each first microstructure close to a middle region of the light-scattering area is greater than the width of each first microstructure close to a side region of the light-scattering area.

3. The diffuser plate according to claim 1, wherein on a cross section of the plate body across the light-scattering areas and the light-gathering areas, the ratio of the width of the light-scattering area to the width of the light-gathering area is between 0.33 and 3.

4. The diffuser plate according to claim 3, wherein the width of the light-scattering areas and the width of the light-gathering areas are the same.

5. The diffuser plate according to claim 1, wherein the first microstructure includes a cambered unit having a convex cambered surface, and the second microstructure includes a prism lens.

6. The diffuser plate according to claim 5, wherein the cambered unit includes a semi-cylindrical lens extending longitudinally along the plate body, and the side face of the semi-cylindrical lens forms the convex cambered surface.

7. The diffuser plate according to claim 5, wherein in the same light-scattering area, the curvature of the convex cambered surface of each cambered unit close to a middle region of the light-scattering area is smaller than the curvature of the convex cambered surface of each cambered unit close to a side region of the light-scattering area.

8. The diffuser plate according to claim 5, wherein the prism lens has two side surfaces, and, in the same light-gathering area, the intersecting angle of the side surfaces of each prism lens close to a middle region of the light-gathering area is smaller than the intersecting angle of the side surfaces of each prism lens close to a side region of the light-gathering area.

9. The diffuser plate according to claim 5, wherein the width of each cambered unit is between 40 μm and 800 μm.

10. The diffuser plate according to claim 5, wherein the height of each cambered unit is between 20 μm and 400 μm.

11. The diffuser plate according to claim 5, wherein the angle of each prism lens is between 75° and 150°.

12. The diffuser plate according to claim 5, wherein the transmittance of the plate body is greater than 75%.

13. The diffuser plate according to claim 5, wherein the prism lens extends longitudinally along the plate body and includes a polygonal cross section, and the convex cambered surface is disposed next to the prism lens.

14. The diffuser plate according to claim 13, wherein the polygonal cross section includes a triangular cross section.

15. A backlight module, comprising:
a light source module having a plurality of light sources; and
a diffuser plate disposed on the top of the light source module, including:
a plate body having a light-entrance surface and a light-exit surface, wherein the light-entrance surface is facing the light source module;
a plurality of light-scattering areas disposed on at least one of the light-entrance surface and the light-exit surface of the plate body, wherein each light-scattering area includes a plurality of first microstructures, and each light-scattering area is disposed corresponding to each light source; and
a plurality of light-gathering areas disposed on at least one of the light-entrance surface and the light-exit surface of the plate body, wherein each light-gathering area includes a plurality of second microstructures;

wherein the light-gathering areas and the light-scattering areas are alternately disposed while the light-gathering area is disposed corresponding to the interval between two adjacent light sources, the widths of the first microstructures in the light-scattering area varies in accordance with the distance between each first microstructures and the closest second microstructure.

16. The backlight module according to claim 15, wherein in the same light-scattering area, the width of each first microstructure close to a middle region of the light-scattering area is greater than the width of each first microstructure close to a side region of the light-scattering area.

17. The backlight module according to claim 15, wherein the transmittance of the plate body is greater than 75%.

18. The backlight module according to claim 15, wherein the width of each light-scattering area is 0.25 to 0.75 times the distance between two adjacent light sources.

19. The backlight module according to claim 15, wherein on a cross section of the plate body across the light-scattering areas and the light-gathering areas, the ratio of the width of the light-scattering area to the width of the light-gathering area is between 0.33 and 3.

20. The backlight module according to claim 19, wherein the width of the light-scattering area and the width of the light-gathering area are the same.

21. The backlight module according to claim 15, wherein the first microstructure includes a cambered unit having a convex cambered surface, and the second microstructure includes a prism lens.

22. The backlight module according to claim 21, wherein the cambered unit includes a semi-cylindrical lens extending longitudinally along the plate body, and the side face of the semi-cylindrical lens forms the convex cambered surface.

23. The backlight module according to claim 21, wherein in the same light-scattering area, the curvature of the convex cambered surface of each cambered unit close to a middle region of the light-scattering area is smaller than the curvature of the convex cambered surface of each cambered unit close to a side region of the light-scattering area.

24. The backlight module according to claim 21, wherein the prism lens has two side surfaces, and the intersecting angle of the side surfaces is 0.85 to 1.15 times the intersecting angle of the light emitted from two adjacent light sources.

25. The backlight module according to claim 21, wherein the width of each cambered unit is between 40 μm and 800 μm.

26. The backlight module according to claim 21, wherein the height of each cambered unit is between 20 μm and 400 μm.

27. The backlight module according to claim 21, wherein the angle of each prism lens is between 75° and 150°.

28. The backlight module according to claim 21, wherein the prism lens extends longitudinally along the plate body and includes a polygonal cross section, and the convex cambered surface is disposed next to the prism lens.

29. The backlight module according to claim 28, wherein the polygonal cross section includes a triangular cross section.

30. The backlight module according to claim 21, wherein the prism lens has two side surfaces, and, in the same light-gathering area, the intersecting angle of the side surfaces of each prism lens close to a middle region of the light-gathering area is smaller than the intersecting angle of the side surfaces of each prism lens close to a side region of the light-gathering area.

31. The backlight module according to claim 30, wherein the intersecting angle of the two side surfaces is 0.5 to 1.5 times the intersecting angle of the light emitted from two adjacent light sources.

* * * * *